(12) United States Patent
Ng et al.

(10) Patent No.: US 9,496,910 B1
(45) Date of Patent: Nov. 15, 2016

(54) UNIVERSAL FOLIO CASE WITH ADJUSTABLE FIT FOR A MOBILE ELECTRONIC DEVICE

(71) Applicant: Samsonite IP Holdings S.àr.l., Luxembourg (LU)

(72) Inventors: Alan Yu Tung Ng, San Francisco, CA (US); Tyler Thomas Wagnor, San Mateo, CA (US); Bryan Lee Hynecek, Redwood City, CA (US); Randy Chiang, San Francisco, CA (US)

(73) Assignee: Samsonite IP Holdings S.àr.l., Luxembourg (LU)

( * ) Notice: Subject to any disclaimer, the term of this patent is extended or adjusted under 35 U.S.C. 154(b) by 0 days.

(21) Appl. No.: 14/883,307

(22) Filed: Oct. 14, 2015

(51) Int. Cl.
*H04M 1/00* (2006.01)
*H04B 1/3888* (2015.01)
*H04M 1/12* (2006.01)

(52) U.S. Cl.
CPC ............ *H04B 1/3888* (2013.01); *H04M 1/12* (2013.01)

(58) Field of Classification Search
CPC .............................. H04B 1/3888; H04M 1/12
See application file for complete search history.

(56) References Cited

U.S. PATENT DOCUMENTS

| 9,317,076 B2* | 4/2016 | Rayner | F16M 13/00 |
| 2013/0075543 A1* | 3/2013 | Krohn | G06F 1/1632 |
| | | | 248/121 |
| 2016/0094262 A1* | 3/2016 | Chorny | H04B 1/385 |
| | | | 455/575.6 |

* cited by examiner

*Primary Examiner* — Chuong A Ngo
(74) *Attorney, Agent, or Firm* — Frommer Lawrence & Haug LLP

(57) ABSTRACT

An adjustable case for a mobile electronic device. The case has a bottom including a main chassis, a fixed holding member fixedly connected with the main chassis, a sliding holding member slidedly connected to the main chassis to slide back and forth, and a tension mechanism biasing the sliding holding member towards the fixed holding member so that the fixed holding member and the sliding holding member squeeze the mobile electronic device when fitted in the case. A plurality of friction members is fixed to a mobile-device-facing surface of the case bottom so that the friction members contact a bottom of the mobile electronic device when the mobile electronic device is fitted in the case. A plurality of raised corner sidewalls is also provided, each sidewall arranged at a corner of the main chassis to extend in a mobile-device-facing direction from the mobile-device-facing surface of the bottom of the case.

16 Claims, 4 Drawing Sheets

UNIVERSAL FOLIO CASE WITH ADJUSTABLE FIT FOR A MOBILE ELECTRONIC DEVICE

FIELD OF THE INVENTION

The present invention relates to a universal folio-type case that adjusts to fit various mobile electronic devices. In a preferred embodiment, the folio case has an integrated adjustment mechanism that adjusts the case so it can fit various sizes of mobile electronic devices.

Sophisticated mobile electronic devices are becoming increasingly common—for example, so-called tablet computers such as Apple® iPad® devices, Amazon Kindle devices (e.g., Kindle e-readers and Fire devices), Samsung Galaxy devices (e.g., Tab, Note, and GT devices), Microsoft Surface devices, and the like. Other examples include so-called smartphones such as Apple® iPhone® devices, Samsung Galaxy devices, Motorola DROID™ devices, and the like. Such a mobile device typically includes a display screen with a touch sensitive surface to allow the user to interact with the device. A mobile device may also include one or more of a number of input and output mechanisms—such as microphones, speakers, buttons, knobs, cameras, flashes, light meters—as well as ports for connecting the device to other devices, for example, for syncing the device with a computer, to connect headphones, for connecting the device with a source of charging current, and for communicating wirelessly using an infrared transducer.

Mobile electronic devices typically have their own unique sizes. As such, a protective case designed for one specific mobile device will not fit any other mobile device, even one of the same brand. For example, a protective case for an Apple iPad will not fit an Apple iPad Mini. So it is desirable to provide a single case that can be adjusted to fit various mobile electronic devices. Some such adjustable cases are already available. For example, the Belkin Universal Cover and the Griffin TurnFolio. But while these cases adjust to fit various mobile electronic devices, they do not provide much protection against impact if the device is dropped.

SUMMARY OF THE INVENTION

As such, there is a need for a single case that can be adjusted to fit various mobile electronic devices while also providing improved protection from impact events.

According to the present invention there is therefore provided an adjustable universal case for a mobile device as described by way of example below and in the accompanying claims.

In one embodiment of the invention there is provided an adjustable case for a mobile electronic device. The adjustable case has a bottom that includes a main chassis, a fixed holding member fixedly connected with the main chassis, a sliding holding member slidedly connected to the main chassis to slide back and forth, and a tension mechanism, which biases the sliding holding member towards the fixed holding member so that the fixed holding member and the sliding holding member are configured to squeeze the mobile electronic device when the mobile electronic device is fitted in the case. A plurality of friction members is fixed to a mobile-device-facing surface of the bottom of the case so that the friction members contact a bottom of the mobile electronic device when the mobile electronic device is fitted in the case. The bottom of the adjustable case also includes a plurality of raised corner sidewalls, each being arranged at a corner of the main chassis and extending in a mobile-device-facing direction from the mobile device facing surface of the bottom of the case.

In another embodiment, the friction members comprise at least one material selected from the group consisting foam materials, elastomeric materials, styrene-butadiene rubber, ethylene-vinyl acetate, and neoprene.

In yet another embodiment, the tension mechanism includes an elastic member.

In a further embodiment, the tension mechanism includes a spring member.

In yet a further embodiment, the main chassis includes at least one rigid or semi-rigid material selected from the group consisting of plastic materials, rigid rubber materials, engineering thermoplastic materials, composite materials, polycarbonate materials, and para-aramid materials In another embodiment, the raised corner sidewalls each comprises at least one rigid or semi-rigid material selected from the group consisting of plastic materials, rigid rubber materials, engineering thermoplastic materials, polycarbonate materials, and para-aramid materials In yet another embodiment, the raised corner sidewalls are integral with the main chassis.

In a further embodiment, the raised corner sidewalls are raised at least 3.00 mm from the mobile device facing surface of the bottom of the case.

In yet a further embodiment, the raised corner sidewalls are raised from 5.00-20.00 mm from the mobile device facing surface of the bottom of the case.

In another embodiment, the raised corner sidewalls are raised from 8.00-15.00 mm from the mobile device facing surface of the bottom of the case.

In yet another embodiment, the raised corner sidewalls are solid without any holes.

In a further embodiment, the case further includes a top which is hingedly connected to the bottom of the case to switch between a state where the top is disposed over the mobile-device-facing surface of the bottom of the case, and a state where the top is swung away from and exposes the mobile-device-facing surface of the bottom of the case.

In yet a further embodiment, the top includes a groove, and the case is switchable into a standing state in which the bottom of the case is arranged in the groove of the top.

In another embodiment, the mobile electronic device includes a screen on a face of the mobile electronic device, and two pairs of opposite sides that form a rectangular perimeter around the face. The fixed holding member and the sliding holding member of the case are configured to engage with one of the pairs opposite sides of the perimeter of the mobile electronic device when the mobile electronic device is fitted in the case.

In yet another embodiment, the two pairs of opposite sides of the mobile electronic device include a short pair of opposite sides and a long pair of opposite sides that are longer than the short pair of opposite sides. The fixed holding member and the sliding holding member of the case are configured to engage with the long pair of opposite sides of the perimeter of the mobile electronic device when the mobile electronic device is fitted in the case.

In a further embodiment, the adjustable case is configured to be switched to a standing state where the adjustable case fully supports itself on a resting surface and maintains a surface of the main chassis, extending between the fixed holding member and the sliding holding member, at an inclined angle with respect to the resting surface. The sliding holding member is arranged in the bottom of the case so that the sliding holding member is located below the fixed holding member when the case is in the standing state.

It is noted that the features of the above-described embodiments are not exclusive to each other, and that any one of the above embodiments/features can be combined with one or more of the other embodiments/features to arrive at further embodiments.

The inventive case can be designed to fit a variety of mobile devices-such as tablets, laptop computers, smartphones, and other portable electronic devices.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments. It is noted that any numerical ranges disclosed herein are included to individually disclose every sub-range and number, both whole integer and partial fraction, within the disclosed range. For example, a disclosed range of 1-100 is intended to individually disclose 20-90, 40-80, 30.5-50.2, 20, 67.3, 84.512924, and every other range and number that falls within the recited range.

Figure 1:
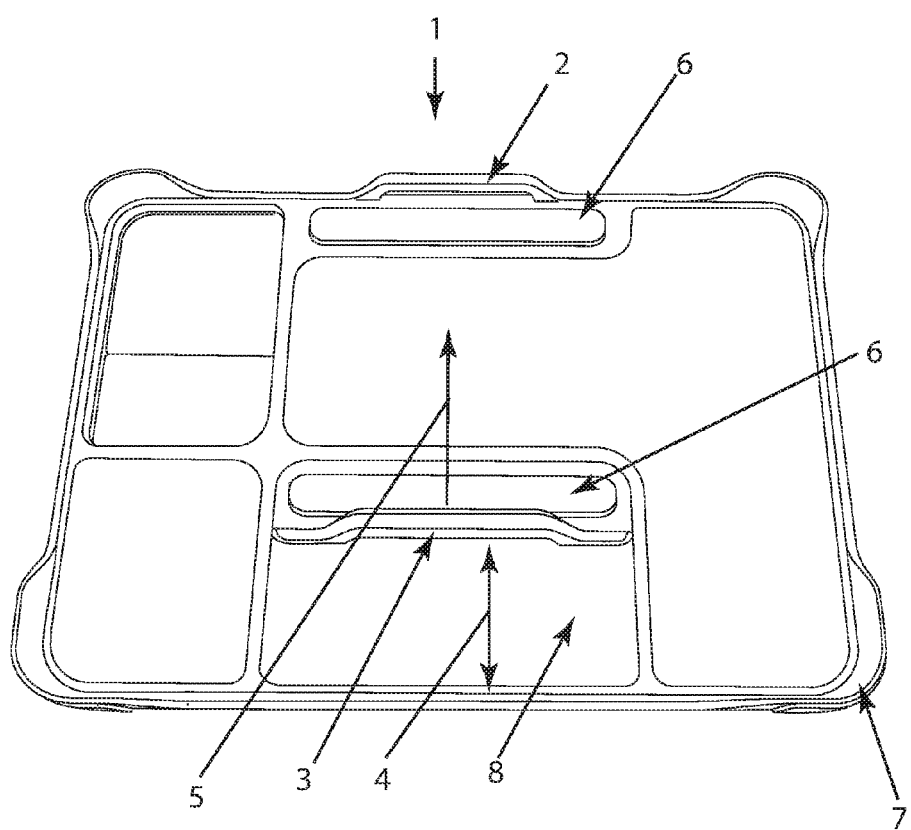
FIG. 1 shows a mobile-device-facing side, or inside, of a bottom of an adjustable case according to an embodiment of the invention.
Figure 2:
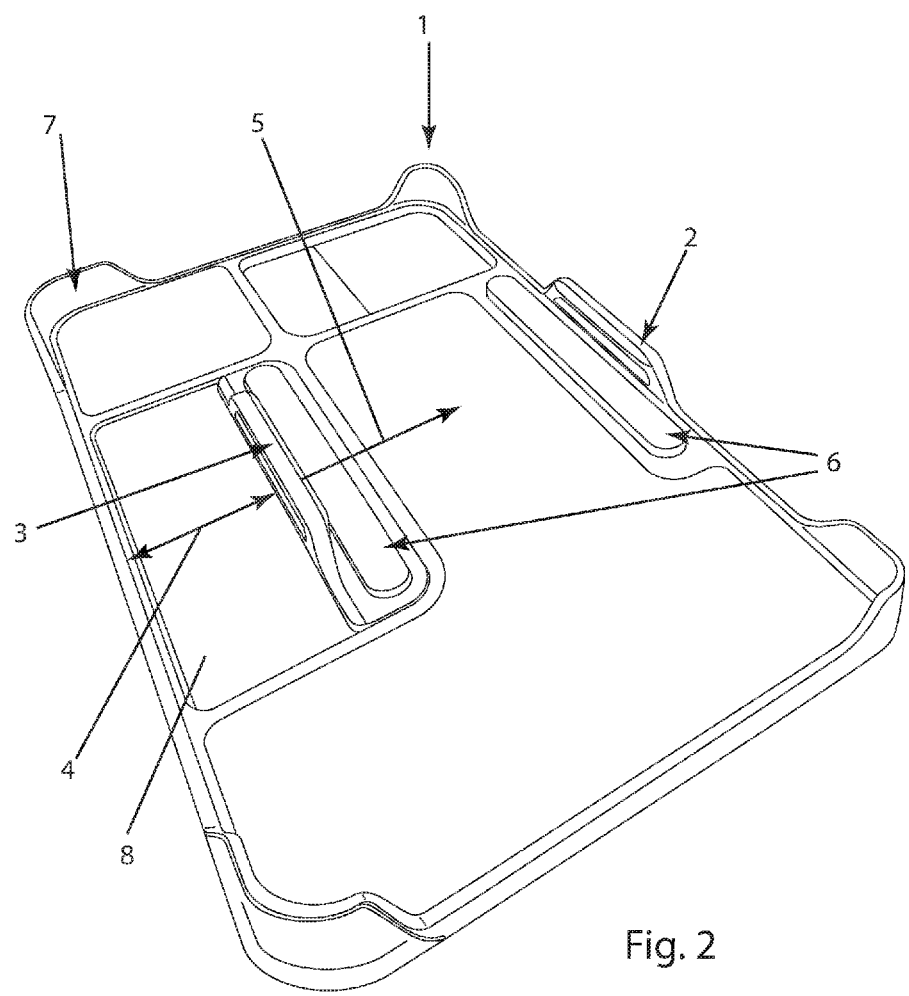
FIG. 2 shows a perspective view of a mobile-device-facing side, or inside, of a bottom of an adjustable case according to an embodiment of the invention.

FIG. 1 shows an inside (i.e., a mobile-device-facing side) of a bottom 1 of an adjustable case according to an embodiment of the invention. FIG. 2 shows a perspective view of the mobile-device-facing side, or inside, of a bottom of an adjustable case according to an embodiment of the invention.

The bottom 1 of the case includes a fixed holding component 2 and a sliding holding component 3. A mobile electronic device is securely held between the fixed holding component 2 and the sliding holding component 3. The sliding holding component 3 slides back and forth in a sliding direction 4 so that the sliding holding component 3 can be slid to hold mobile devices of various sizes. A sliding channel 8 guides the sliding holding component 3 as it slides back and forth in the sliding direction 4. The sliding holding component 3 is biased by a biasing mechanism (not shown—such as a spring or an elastic member—in a biasing direction 5 toward the fixed holding component 3 so that the fixed holding component 3 and the sliding holding component 4 squeeze the mobile device when the mobile device is fitted in the case. In this way, various sized mobile devices can be held in the case securely.

The mobile device usually includes a screen on one face of the device, and four sides that form a perimeter around this face. Typically, the perimeter of the mobile device forms a rectangle with one pair of opposing sides longer than the other pair of opposing sides. In the embodiment shown in FIGS. 1 and 2, the fixed holding component 3 and the sliding holding component 4 squeeze the mobile device by engaging with one of the pairs of opposing sides. These opposing sides are preferably the longer sides of the mobile device.

The bottom 1 of the universal case also includes friction pads 6. The friction pads 6 contact a bottom of the mobile device when the mobile device is fitted in the case and held by the holding components 2, 3. The friction pads 6 provide friction resistance against the bottom of the mobile device to prevent the mobile device from sliding out of the case. The friction pads 6 also, in an impact event, decelerate a movement of the mobile device within the case—for instance when the mobile device is smaller than the outer dimensions of the case-so as to absorb some of the energy of the impact and thereby reduce the force transferred to the mobile device. One or more friction pads 6 may be affixed to the sliding holding component 3, as shown in FIGS. 1 and 2, or may be affixed to another non-sliding portion of the mobile-device-facing side of the bottom 1 of the case, or may be fixed to both the sliding holding component and a non-sliding portion.

The friction pads 6 are preferably made of foam, such as polyurethane foam. Other examples of suitable materials for the friction pads 6 include an elastomeric material, styrene-butadiene rubber ("SBR"), ethylene-vinyl acetate ("EVA"), and neoprene.

The bottom 1 of the case also includes raised corner sidewalls 7 that provide additional protection to a mobile device when it is fitted in the universal case to prevent the mobile device from sliding out of the case. The raised corner sidewalls 7 also provide additional impact protection for the corners of the mobile device when the mobile device is fitted in the case. In particular, when the mobile device is arranged in the case, the raised corner sidewalls 7 are located between the corners of the mobile device and an outside of the case. In this way, the raised corner sidewalls 7 prevent the corners of the mobile device from directly contacting the ground in the occurrence of an impact event. The figures show the sidewalls 7 as solid pieces, but they may be of another configuration—such as a waffled configuration—so long as any holes or openings in the sidewalls are not large enough to allow exterior contact with a corner of the mobile device through the corner sidewall 7.

The raised corner sidewalls 7 are each arranged at a corner of the main chassis 12 and extend in a mobile-device-facing direction from a mobile-device-facing surface of the bottom of the case. The raised corner sidewalls 7 are preferably raised at least 3.00 mm from the mobile-device-facing surface of the bottom of the case. The raised corner sidewalls are more preferably raised from 5-20 mm, and most preferably raised from 8-15 mm, from the mobile-device-facing surface of the bottom of the case. Even more preferably, the raised corner sidewalls are raised from 11.50-13.25 mm, from the mobile-device-facing surface of the bottom of the case.

The raised sidewalls 6 and the main chassis portion 12 (see FIG. 4) are preferably made of a rigid or semi-rigid material. Examples of suitable materials for the raised sidewalls 6 include selected from the group consisting of plastic materials, rigid rubber materials, engineering thermoplastic materials, composite materials, polycarbonate materials, and para-aramid materials. The main chassis portion 12 may be injection-molded.

During a sufficiently strong drop impact, the friction pads 6 and the raised corner sidewalls 7 together allow the mobile device to slide along the friction pads in a controlled manner into the raised corner sidewalls. The friction pads decelerate the device before impact and the corners protect the device from hitting the ground. In short, the case provides enclosed impact protection where other adjustable-fit tablet cases do not. In addition, the single sliding holding component 4 allows for efficient installation and uninstallation of the tablet device.

Figure 3:
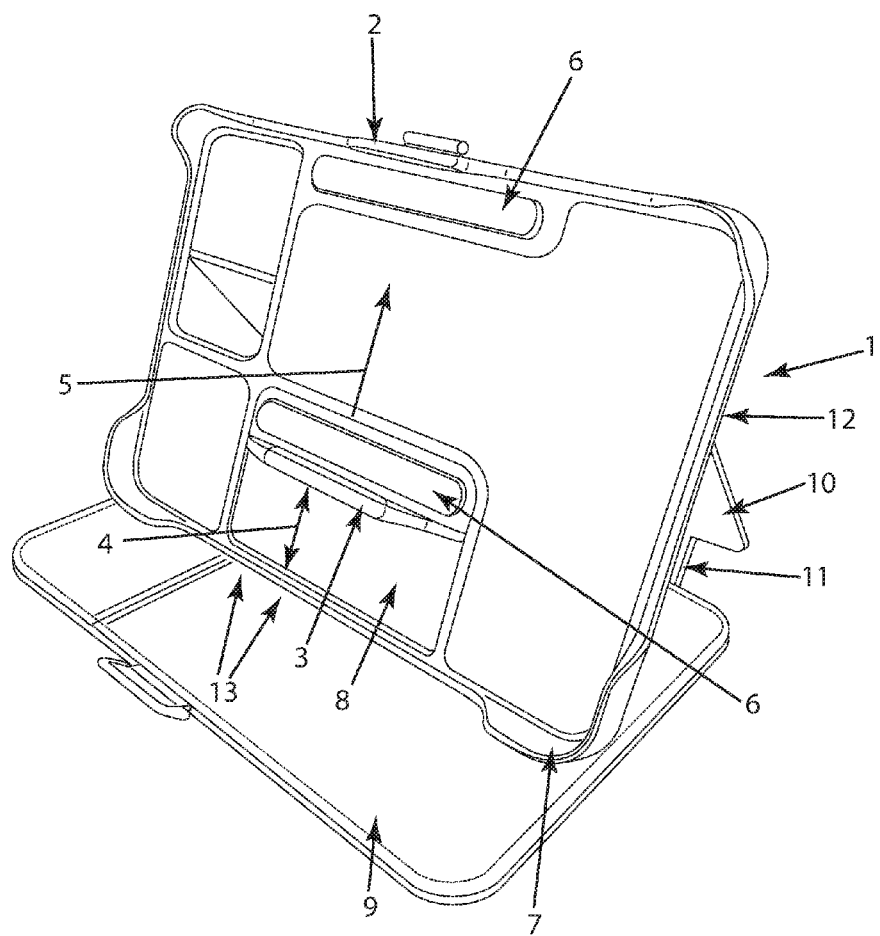
FIG. 3 shows a perspective view of a mobile-device-facing side, or inside, of a bottom of an adjustable case according to an embodiment of the invention in a standing state of the adjustable case.

In addition, as shown in FIG. 3, the case may include a top 9 which is hingedly connected to portion 10 of the bottom 1 of the case via a hinge portion 11. The portion 10 can be configured to swing out away from the main chassis portion 12 of the bottom 1 of the case so that the case can be switched to a standing state. Grooves 13 securely hold the main chassis portion 12 of the case to maintain the case in the standing state.

Preferably, as shown in FIG. 3, the sliding holding component 4 is arranged in the bottom 1 of the case so that the sliding holding component 4 is located below the fixed holding component 3 when the case is in the standing state. In this way, when the case is in the standing state and rested on a surface (e.g., table, desk, bed, etc.), the mobile device is held as high in the case as possible, thereby elevating the mobile device from the resting surface and improving viewability of the screen of the mobile device.

Figure 4:
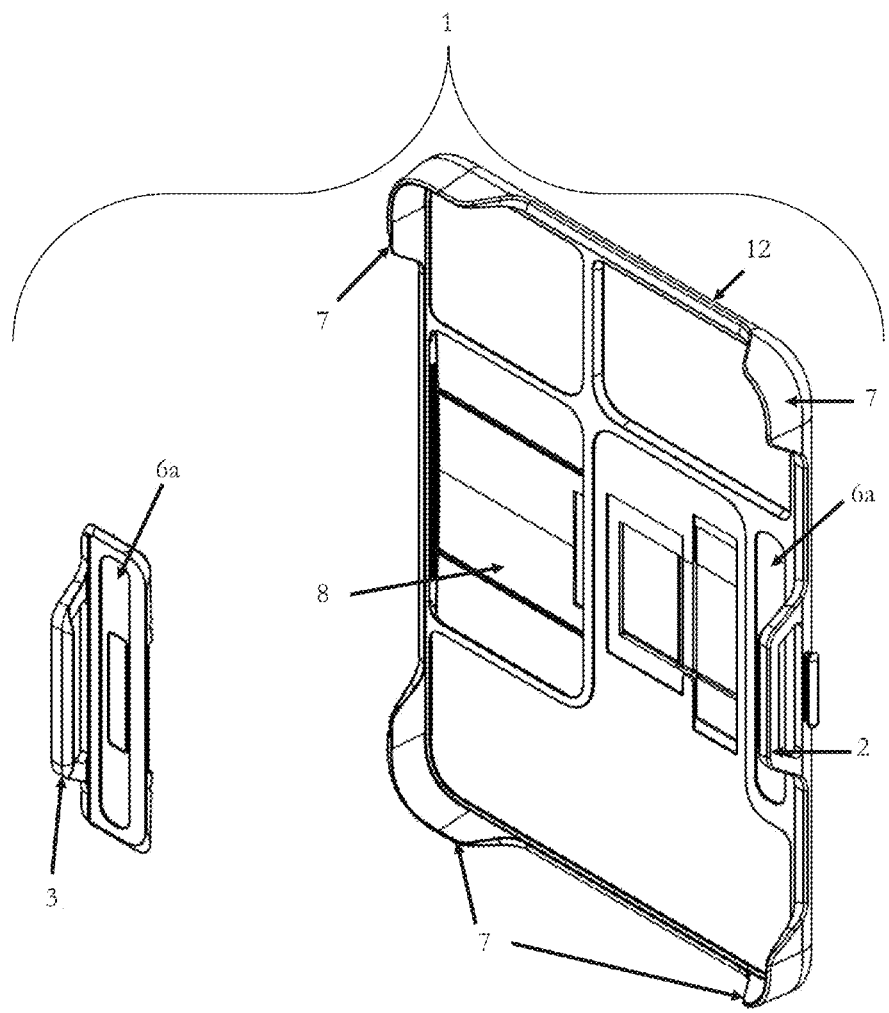
FIG. 4 shows an exploded view of a mobile-device-facing side, or inside, of a bottom of an adjustable case according to an embodiment of the invention.

FIG. 4 shows an exploded view of a mobile-device-facing side, or inside, of the bottom 1 of the adjustable case.

It is noted that the terminology used above is for the purpose of reference only, and is not intended to be limiting. For example, terms such as "upper", "lower", "above", "below", "rightward", "leftward", "clockwise", and "counterclockwise" refer to directions in the drawings to which reference is made. As another example, terms such as "inward" and "outward" may refer to directions toward and away from, respectively, the geometric center of the component described. As a further example, terms such as "front", "rear", "side", "leftside", "rightside", "top", "bottom", "horizontal", and "vertical" describe the orientation of portions of the component within a consistent but arbitrary frame of reference which is made clear by reference to the text and the associated drawings describing the component under discussion. Such terminology will include the words specifically mentioned above, derivatives thereof, and words of similar import.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

In addition, it is noted that citation or identification of any document in this application is not an admission that such document is available as prior art to the present invention.

The invention claimed is:

1. An adjustable case for a mobile electronic device, said adjustable case comprising:
   a bottom comprising
      a main chassis;
      a fixed holding member fixedly connected with the main chassis;
      a sliding holding member slidedly connected to the main chassis to slide back and forth;
      a tension mechanism, which biases the sliding holding member towards the fixed holding member so that the fixed holding member and the sliding holding member are configured to squeeze the mobile electronic device when the mobile electronic device is fitted in the case;
      a plurality of friction members fixed to a mobile-device-facing surface of the bottom of the case so that the friction members contact a bottom of the mobile electronic device when the mobile electronic device is fitted in the case; and
      a plurality of raised corner sidewalls, each being arranged at a corner of the main chassis and extending in a mobile-device-facing direction from the mobile-device-facing surface of the bottom of the case.

2. The adjustable case according to claim 1;
   wherein the friction members comprise at least one material selected from the group consisting foam materials, elastomeric materials, styrene-butadiene rubber, ethylene-vinyl acetate, and neoprene.

3. The adjustable case according to claim 1;
   wherein the tension mechanism comprises an elastic member.

4. The adjustable case according to claim 1;
   wherein the tension mechanism comprises a spring member.

5. The adjustable case according to claim 1;
   wherein the main chassis comprises at least one rigid or semi-rigid material selected from the group consisting of plastic materials, rigid rubber materials, engineering thermoplastic materials, composite materials, polycarbonate materials, and para-aramid materials.

6. The adjustable case according to claim 1;
   wherein the raised corner sidewalls each comprises at least one rigid or semi-rigid material selected from the group consisting of plastic materials, rigid rubber materials, engineering thermoplastic materials, composite materials, polycarbonate materials, and para-aramid materials.

7. The adjustable case according to claim 1;
   wherein the raised corner sidewalls are integral with the main chassis.

8. The adjustable case according to claim 1;
   wherein the raised corner sidewalls are raised at least 3.00 mm from the mobile-device-facing surface of the bottom of the case.

9. The adjustable case according to claim 8;
   wherein the raised corner sidewalls are raised from 5.00-20.00 mm from the mobile-device-facing surface of the bottom of the case.

10. The adjustable case according to claims 9;
    wherein the raised corner sidewalls are raised from 8.00-15.00 mm from the mobile-device-facing surface of the bottom of the case.

11. The adjustable case according to claim 1;
    wherein the raised corner sidewalls are solid without any holes.

12. The adjustable case according to claim 1, further comprising:
    a top which is hingedly connected to the bottom of the case to switch between:
       a state where the top is disposed over the mobile-device-facing surface of the bottom of the case; and a state where the top is swung away from and exposes the mobile-device-facing surface of the bottom of the case.

13. The adjustable case according to one claim 12;
wherein the top comprises a groove; and
wherein the case is switchable into a standing state in which the bottom of the case is arranged in the groove of the top.

14. The adjustable case according to claim 1;
wherein the mobile electronic device includes:
  a screen on a face of the mobile electronic device; and
  two pairs of opposite sides that form a rectangular perimeter around the face; and
wherein the fixed holding member and the sliding holding member are configured to engage with one of the pairs of opposite sides of the perimeter of the mobile electronic device when the mobile electronic device is fitted in the case.

15. The adjustable case according to claim 14;
wherein the two pairs of opposite sides of the mobile electronic device comprise:
  a short pair of opposite sides; and
  a long pair of opposite sides that are longer than the short pair of opposite sides; and
wherein the fixed holding member and the sliding holding member are configured to engage with the long pair of opposite sides of the perimeter of the mobile electronic device when the mobile electronic device is fitted in the case.

16. The adjustable case according to claim 1;
wherein the adjustable case is configured to be switched to a standing state where the adjustable case fully supports itself on a resting surface and maintains a surface of the main chassis, extending between the fixed holding member and the sliding holding member, at an inclined angle with respect to the resting surface; and
wherein the sliding holding member is arranged in the bottom of the case so that the sliding holding member is located below the fixed holding member when the case is in the standing state.

\* \* \* \* \*